United States Patent [19]

Hara et al.

[11] Patent Number: 5,283,279

[45] Date of Patent: Feb. 1, 1994

[54] FLAME RETARDANT COATING COMPOSITIONS AND COATED ARTICLES

[75] Inventors: Yasuaki Hara; Morizo Nakazato, both of Annaka; Yasunori Takaichi, Hitachi; Tsuyoshi Urashima, Takahagi; Tsuyoshi Aoyama, Houya; Seiichi Nishimura, Tokorozawa, all of Japan

[73] Assignee: Shin-Etsu Chemical Co., Ltd., Tokyo, Japan

[21] Appl. No.: 701,878

[22] Filed: May 17, 1991

[30] Foreign Application Priority Data

May 18, 1990 [JP] Japan .................. 2-128680

[51] Int. Cl.$^5$ .................. C08J 5/10; C08K 3/34; C08L 83/10
[52] U.S. Cl. .................. 524/492; 524/188; 524/425; 524/451; 524/493; 524/588; 524/858; 524/859; 524/860; 524/865
[58] Field of Search ............... 524/188, 425, 451, 858, 524/859, 860, 865, 588, 492, 493

[56] References Cited

U.S. PATENT DOCUMENTS 4,769,405  9/1988  Kondo et al. .................. 524/860
5,004,771  4/1991  Feder et al. .................. 524/745

Primary Examiner—Paul R. Michl
Assistant Examiner—U. K. Rajguru
Attorney, Agent, or Firm—Birch, Stewart, Kolasch & Birch

[57] ABSTRACT

A coating composition comprising (A) a polyorganosiloxane graft copolymer emulsion, (B) a reaction product between an amino functional silane and/or a hydrolyzate thereof and an acid anhydride, (C) colloidal silica, (D) a curing catalyst, and (E) an inorganic filler is useful in coating exterior and interior building materials. The composition is applicable to a substrate to form a coating at room temperature having sufficient extensibility to follow cracks in the underlying substrate as well as low-to-high temperature sensitive performance, moisture permeability, flame retardance, and decorative effect.

17 Claims, No Drawings

FLAME RETARDANT COATING COMPOSITIONS AND COATED ARTICLES

The present invention relates to flame retardant coating compositions and articles coated therewith. More particularly, the present invention relates to flame retardant coating compositions for use in coating building materials such as concrete structures, prestressed concrete panels, aerated concrete panels, and slate panels.

BACKGROUND OF THE INVENTION

For finish coating of interior and exterior building materials such as concrete structures, prestressed concrete (PC) panels, aerated concrete (ALC) panels, and slate panels, hitherto cement, acrylic, epoxy and cellulosic finish coating compositions have been used as well as synthetic resin emulsion paints.

These finish coating compositions, however, are too hard to follow cracks which can occur in the underlying substrate. If cracks occur in the substrate, then cracks will also appear in the finish coating, resulting in the coating being lifted and separated near the cracks and thereby base its water-proof function.

To improve the crack-following and water-proof capabilities that the hard finish coating compositions lack, there are known elastic finish coating compositions which have both the water-proofness and decorative effect, for example, acrylic rubber, acrylic resin, chloroprene rubber and urethane rubber base finish coating compositions. These elastic finish coating compositions are used in single and multi-layer forms, for example, by applying solutions of acrylic urethane resins and acrylate resins as protective and decorative coatings.

Coatings of these organic elastic finish coating compositions show elastomeric behavior enough to follow cracks which can occur in the underlying substrate, restricting the appearance of cracks on the exterior surface thereof. The organic elastic finish coating compositions, however, are not only poor in flame retardance and low-temperature elongation, but also have low moisture permeability so that moisture can condense at the interface between the coating and substrate, causing blisters and freezing damages to the coatings.

Finish coating compositions based on silicone rubber were proposed to eliminate these drawbacks. The silicone base elastic finish coating compositions are generally classified into the solution and emulsion types depending on whether room-temperature vulcanizable silicone rubber is dissolved in a solvent or dispersed in water. The silicone elastic finish coating compositions of either type show elastomeric behavior and can follow cracks which can occur in the underlying substrate like the above-mentioned organic elastic finish coatings compositions, and at the same time, exhibit improved temperature-sensitive performance from low temperatures of the order of −20° C. to high temperatures of the order of 60° C. as well as improved moisture permeability and flame retardance due to the silicone polymer structure.

Despite these performance advantages, the silicone base elastic finish coating compositions lack decorative effect. More particularly, silicone elastic coatings are susceptible to stain and from a maintenance aspect, difficult to cover with another resin.

Techniques of blending EPDM or the like are known to overcome these drawbacks of the silicone base elastic finish coating compositions, but the resulting coatings exhibit excessive rubbery nature beyond the acceptable level. Moreover, Japanese Patent Application Kokai No. 267377/1987 discloses a flame retardant elastomeric finish coating composition for interior and exterior uses comprising in admixture, a thermoplastic resin emulsion and a silicone base aqueous emulsion, with various additives added and dispersed therein. This is not satisfactory in stain proofness, flame retardancy, and shelf stability.

SUMMARY OF THE INVENTION

The present invention has been made to eliminate the above-mentioned drawbacks, and its object is to provide a new and improved flame retardant coating composition which can form coatings having sufficient extensibility to follow cracks in the underlying substrate as well as low to high temperature sensitive performance, moisture permeability, flame retardance, and decorative effect and which is of the one-part type capable of curing at room temperature and thus easy to apply. Another object is to provide an article coated with the coating composition.

The present inventors have found that the above and other objects can be attained by a coating composition which is formulated by blending a major proportion of an emulsion of a polyorganosiloxane graft copolymer composed of a polyorganosiloxane and 10 to 90% by weight of an unsaturated vinyl monomer graft polymerized therewith with a reaction product between an amino functional silane and/or a hydrolyzate thereof and an acid anhydride, colloidal silica, a curing catalyst, and an inorganic filler.

We have found that the coating composition of this formulation is of one-part curable emulsion type, free of safety and hygienic problems, easy to apply on a variety of articles, and capable of being cured into an elastomer to form a coating as water is removed after application. Advantageously, this curing takes place at room temperature. The resulting coating is flame retardant and extensible and can adhere to the underlying substrate and follow any crack induced in the substrate, without losing water proof function. Also, the coating exhibits improved temperature-sensitive performance from low temperatures of the order of −20 C. to high temperatures of the order of 60° C., especially improved extensibility at low temperatures. The coating also has sufficient moisture permeability to avoid moisture condensation at the coating-substrate interface, eliminating freezing damages. Further, the coating is less susceptible to stain, that is, it has stain resistance. In addition, all these functions can be achieved by a single coating. The present invention is predicated on these findings.

Therefore, the present invention is directed to a flame retardant coating composition comprising (A) 100 parts by weight, calculated in terms of the copolymer, of a polyorganosiloxane graft copolymer emulsion, the copolymer being composed of a polyorganosiloxane having 10 to 90% by weight of an unsaturated vinyl monomer graft polymerized therewith, (B) 0.1 to 10 parts by weight of a reaction product of an amino functional silane and/or a hydrolyzate thereof and an acid anhydride, (C) 1 to 50 parts by weight of colloidal silica, (D) 0.01 to 10 parts by weight of a curing catalyst, and (E) 20 to 100 parts by weight of an inorganic filler.

Also contemplated herein is an article coated with the coating composition defined herein.

DETAILED DESCRIPTION OF THE INVENTION

The coating compositions of the invention use components (A) to (E) as essential components.

Component (A) is a polyorganosiloxane graft copolymer emulsion, more particularly an emulsion of a copolymer composed of a polyorganosiloxane having an unsaturated vinyl monomer graft polymerized therewith. The polyorganosiloxane is preferably of the general formula:

$$R^1_n SiO_{(4-n)/2} \tag{1}$$

wherein $R^1$ is hydrogen, an alkyl group having 1 to 6 carbon atoms, an alkenyl group having 2 to 6 carbon atoms or an aryl group having 6 to 12 carbon atoms such as a methyl, ethyl, propyl or phenyl group, and n is a number equal to 0, 1 or 2. The unsaturated vinyl monomer may be selected from styrene, α-methylstyrene, (meth)acrylic acid, (meth)acrylates such as butyl acrylate, butadiene, isoprene, etc., with the (meth)acrylic acid and (meth)acrylates being preferred.

The polyorganosiloxane graft copolymer emulsions may be prepared by a variety of conventional well known methods. For example, such an emulsion can be prepared by emulsifying a trialkoxysilane of the general formula:

$$RSi(OR^4)_3 \tag{2}$$

wherein R is a monovalent organic group having 1 to 12, preferably 1 to 6 carbon atoms such as alkyl and aryl groups, and $R^4$ is a monovalent organic group having 1 to 6, preferably 1 to 4 carbon atoms such as alkyl and acyl groups, a silane or siloxane grafting agent, and a cyclic organosiloxane in water with the aid of an anionic emulsifier, adding a conventional well-known ring-opening polymerization catalyst such as aliphatic substituted benzene sulfonic acids, aliphatic sulfonic acids, silyl alkyl sulfonic acids and aliphatic substituted diphenyl ether sulfonic acids, effecting ring-opening polymerization at elevated temperatures (for example, 50° C., 15 hours), neutralizing the reaction solution to provide an aqueous emulsion, adding an unsaturated vinyl monomer such as an acrylate and a radical polymerization catalyst such as hydroperoxide, ammonium peroxide and sodium peroxide to the aqueous emulsion, effecting polymerization at elevated temperatures (for example, 70° C., 3 hours), and finally adjusting the pH to provide an organosiloxane graft copolymer emulsion.

The silane or siloxane grafting agents used herein include vinylsiloxanes of the general formula:

$$(CH_2=CH)SiR^2_n O_{(3-n)/2} \tag{3}$$

wherein $R^2$ is hydrogen, an alkyl group having 1 to 6 carbon atoms or an aryl group having 6 to 12 carbon atoms such as a methyl, ethyl, propyl or phenyl group, n is equal to 0, 1 or 2, and mercaptosiloxanes of the general formula:

$$HS(CH_2)_p SiR_n O_{(3-n)/2} \tag{4}$$

wherein R and n are as defined above and p is a number of from 1 to 6.

The cyclic organosiloxanes used herein may have the following general formula:

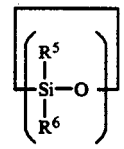

(5)

wherein $R^5$ and $R^6$ are same or different, and preferably hydrogen atom or a monovalent organic group having 1 to 12 carbon atoms such as an alkyl group (e.g., methyl group, ethyl group, propyl group, etc.), an alkenyl group (e.g., vinyl group, allyl group, etc.), an aryl group (e.g., phenyl group, xenyl group, naphthyl group, etc.), a cycloalkyl group (e.g., cyclohexyl group, etc.), a cycloalkenyl group (e.g., cyclohexenyl group), an aralkyl group (e.g., tryl group, xylyl group, etc.), substituted one of these groups in which some hydrogen atoms are replaced by halogen atoms, cyano group or the like (e.g., chloromethyl group, trifluoropropyl group, cyanoethyl group, etc.), an amino group, an epoxy group, a mercapto group, and the like.

The cyclic organosiloxanes include hexamethyltricyclosiloxane, octamethyltetracyclosiloxane, decamethylpentacyclosiloxane, etc. The emulsifying/polymerizing catalysts used herein include sodium lauryl sulfate, dodecylbenzenesulfonates, aliphatic hydrocarbon radical-substituted naphthalenesulphonates, polyethylene glycol sulfate ester salts, lauryl phosphates, etc.

In the present invention, the amount of the unsaturated vinyl monomer graft copolymerized to the polyorganopolysiloxane ranges from 10 to 90% by weight, preferably from 20 to 60% by weight based on the weight of the polyorganopolysiloxane. With a grafting amount of less than 10% by weight, the resulting coating composition is less effective in aesthetic decoration. That is, the coating is susceptible to stain, becomes tacky, and difficult to cover with another resin in the maintenance process. In turn, with a grafting amount of more than 90% by weight, the resulting coating composition shows poor temperaturesensitive performance from low temperatures of about 20° C. to high temperatures of about 60° C., for example, a loss of extensibility in the low temperature range, and provides insufficient flame retardance.

The organosiloxane graft copolymers may have any desired molecular weight although they preferably have a molecular weight of at least 10,000, preferably 10,000 to 1,000,000, more preferably 100,000 to 1,000,000. Also preferably, they have at least two hydroxyl groups, preferably 2 to 10 hydroxyl groups, more preferably 4 to 6 hydroxy groups attached to silicon atoms in a molecule thereof. The organosiloxane graft copolymers are generally present in the emulsions in concentrations of 10 to 70% by weight as calculated based on the non volatile matter left after heating at 105° for 3 hours.

Component (B) used herein is a reaction product between an amino functional silane and/or a hydrolyzate thereof and an acid anhydride, which is effective in improving the adhesion of the coating composition to substrates. It is preferred to blend the reaction product as component (B) in the form of a preparation with colloidal silica as component (C) because the colloidal silica so introduced can provide increased reinforcement to component (A).

The amino functional silanes which can be used for the synthesis of the reaction product as component (B) may be silanes of the general formula:

$$R^3{}_n Si(OR^1)_{4-n} \quad (6)$$

wherein $R^3$ is an amino containing monovalent organic group, for example, 2 aminoethyl, 3-aminopropyl and N (2aminoethyl) 3-aminopropyl groups, m is an integer of 1 to 4, and R' is as defined above, for example, 3-aminopropyltriethoxysilane, N-(2-aminoethyl)-3 aminopropylmethyldimethoxysilane, 3-aminopropylmethyldiethoxysilane, N-(2 aminoethyl) 3-aminopropyltrimethoxysilane, N-triethylenediaminepropyltrimethoxysilane, N-triethylenediaminepropylmethyldimethoxysilane, etc. Also useful are partial hydrolyzates of these amino functional silanes. The amino functional silanes and hydrolyzates thereof may be used alone or in admixture of any two or more of them.

The other reactant of the reaction product (B) is an acid anhydride, examples of which include methyltetrahydrophthalic anhydride, methylhymic anhydride, benzophenonetetracarboxylic anhydride, phthalic anhydride, ethylene glycol bistrimellitate, maleic anhydride, pyromellitic anhydride, succinic anhydride, polyazelaic polyanhydride, trimellitic anhydride, nadic anhydride, phenylmaleic anhydride, methylhexahydrophthalic anhydride, hexahydrophthalic anhydride, dodecylsuccinic anhydride, dichloromaleic anhydride, and chlorendic anhydride alone and mixtures thereof.

Since the reaction of an amino functional silane and/or hydrolyzate thereof with an acid anhydride is exothermic reaction, the reaction product can be readily obtained simply by mixing the reactants at room temperature. Desirably, the reaction is effected in the presence of an organic solvent because the reaction product tends to gel. Examples of the organic solvent include methanol, ethanol, butanol, isopropanol, acetone, methyl ethyl ketone, tetrahydrofuran, and dimethylformamide alone and mixtures thereof.

I is to be understood that the amino functional silane and/or hydrolyzate thereof and the acid anhydride are preferably used in an equimolar ratio in the reaction although either one of the reactants may be used in excess amount without a problem.

Component (C) used herein is colloidal silica, the type of which is not critical. Those colloidal silicas having a particle size of 10 to 40 m $\mu$ and stabilized with sodium or aluminum ions are preferred because they may be readily prepared or commercially available, for example, as Snowtex 40 from Nissan Chemical K.K.

As previously mentioned, reaction product (B) and colloidal silica (C) are preferably added as a preblend or preparation. Preferably components (B) and (C) are used such that there are present 0.1 to 10 parts by weight of component (B) and 1 to 50 parts by weight of component (C) per 100 parts by weight of component (A). Further preferably, there is used 0.1 to 20 parts by weight of component (B) or reaction product per 100 parts by weight of component (C) or colloidal silica. Improved adhesion to substrates is not expected with larger amounts of component (B) or reaction product outside this range, whereas the composition becomes less flowing with smaller amounts of component (B) outside this range.

The preblend or preparation of components (B) and (C) may be obtained by gradually adding dropwise component (B) or reaction product to a predetermined amount of colloidal silica while stirring at room temperature. There is formed an insoluble matter in an initial stage of addition, but as stirring is continued, the mixture turns into a semitransparent flowing liquid which is homogenized in entirety. The preparation of components (B) and (C) may be used in an amount of 1 to 60 parts, preferably 3 to 30 parts by weight per 100 parts by weight of component (A). With an amount of less than 1 60 part, the resulting coating would be less extensible whereas with an amount of more than parts, the coating would have low elongation so that cracks might occur especially in thick coatings.

Component (D) is a curing catalyst for curing the coating composition of the invention. Examples of the curing catalyst include metal salts of organic acids, for example, dibutyltin dilaurate, dioctyltin dilaurate, dibutyltin diacetate, tin octylate, tin laurate, iron octylate, lead octylate, and tetrabutyltitanate, and amine compounds, for example, n-hexylamine and guanidine and salts thereof with hydrochloric acid or the like. The catalysts may be used alone or in admixture of two or more. The curing catalyst is desirably added as an O/W type emulsion which is previously prepared therefrom in a conventional manner using an emulsifier and water. The curing catalyst is used in an amount of 0.01 to 10 parts, preferably 0.1 to 3 parts by weight per 100 parts by weight of component (A) or siloxane copolymer. With less than 0.01 part by weight of the curing catalyst, the coating composition will not cure to a satisfactory extent. With more than 10 parts by weight of the curing catalyst, no additional benefit is recognized on the curing reaction and the resulting coating becomes rather prone to cracking.

Component (E) is an inorganic filler which includes extender pigments such as calcium carbonate, silica other than colloidal silica, clay, kaolin, and talc, titanium dioxide, carbon black, aluminum oxide, quartz, zinc oxide and mica. Preferred are calcium carbonate and titanium dioxide. The fillers may be used alone or in admixture of two or more. The amount of the filler used is 20 to 100 parts, preferably 30 to 60 parts by weight per 100 parts by weight of component (A). With less than 20 parts of the filler, the resulting cured coating is less flame retardant. With more than 100 parts of the filler, the cured coating loses extensibility and has insufficient elongation especially at low temperatures, and the coating composition has a too high viscosity to maintain stability and to apply efficiently.

In addition to the essential components mentioned above, the coating composition of the invention may contain any desired additives, for example, thickeners, dispersants, stabilizers, defoaming agents, and coloring pigments in their commonly used amounts, if necessary.

Using the foregoing components, the coating compositions of the invention may be prepared by any desired methods. Desirably, component (A) or polyorganosiloxane graft copolymer emulsion is first prepared, a preparation of components (B) and (C) as mentioned above is mixed with the emulsion, component (D) or curing catalyst is added thereto, all the components are mixed homogeneously, and component (E) or inorganic filler is finally blended with the homogeneous mixture. Mixing may be effected by conventional agitating means.

The coating compositions of the invention thus obtained are useful in coating interior and exterior building materials such as concrete structures, PC panels, ALC panels, and slate, and best suite for applications where the underlying substrates tend to crack and flame retardant requirements are imposed on the coatings.

The coating compositions of the invention can be applied by conventional techniques to form coatings which cure into elastomers even at room temperature as water evaporates off. The coating composition of the invention can exert its function in the form of a single or stand alone layer coating although it is permissible to form a prime coating or undercoat from another primer composition and then apply the coating composition of the invention as a finish coating or overcoat.

There have been described flame retardant coating compositions which can be efficiently applied to a variety of substrates without a safety or hygienic problem and readily cure to elastic coatings at room temperature. The coatings have sufficient extensibility to follow cracks in the underlying substrate, thereby providing improved water-proofness and possess improved low-to-high temperature sensitive performance, moisture permeability, decorative effect, and flame retardance.

EXAMPLE

Examples of the present invention are given below by way of illustration and not by way of limitation. All parts and percents are by weight unless otherwise stated.

EXAMPLE 1

(1) An emulsion was prepared by mixing 500 parts of octamethylcyclotetrasiloxane, 1.8 parts of phenyltriethoxysilane, 44 parts of γ-mercaptopropyldimethoxysilane, 350 parts of water, and 10 parts of dodecylbenzene sulfonate in a homomixer, and passing twice the mixture through a homogenizer under a pressure of 3000 psi. until a stable emulsion was obtained. The emulsion was poured into a flask, heated at 70° C. for 12 hours, cooled down to room temperature, allowed to stand at room temperature for 24 hours, and then adjusted to pH 7.0 with sodium carbonate. The emulsion had a non volatile content of 48% by weight as left after heating at 105° C. for 3 hours. This polyorganosiloxane emulsion is designated emulsion (I).

(2) A flask was charged with 73 parts of emulsion (I) (35 parts of non volatile matter), 15 parts of water, and 3.5 parts of 1% ammonium persulfate solution and heated to 70°C. To the flask, 9 parts of methyl methacrylate, which corresponded to about 25% by weight relative to the polyorganosiloxane in emulsion (I), were added dropwise over 3 hours. The reaction solution was subjected to post polymerization at 90° C., cooled to room temperature, and then adjusted to pH 7.0 with sodium carbonate. The emulsion had a non-volatile content of 46% by weight and a viscosity of 120 centipoise at 25° C. This polyorganosiloxane graft copolymer emulsion is designated emulsion (II).

(3) Separately 221 parts of 3-aminopropyltriethoxysilane was added dropwise to a mixture of 98 parts of maleic anhydride and 319 parts of ethanol at room temperature with stirring. Continued stirring yielded a reaction product of maleic anhydride and 3 aminopropyltriethoxysilane.

(4) Using an agitator, 1.7 parts of the reaction product and 15.6 parts of colloidal silica (trade name Snowtex 40S available from Nissan Chemical K.K.) were mixed. The mixture was added to 100 parts of emulsion (II) with stirring by a homomixer, and 1.6 parts of a self-emulsifying tin catalyst (which was obtained by emulsifying 30 parts of dibutyltin dilaurate, 1 part of polyoxyethylene nonyl phenyl ether, and 69 parts of water in a conventional manner) was further added thereto, yielding an emulsion composition. The emulsion composition had a non volatile content of 40% by weight, a viscosity of 20 centipoise, and pH 6.2. It is designated emulsion (III).

(5) Coating compositions A and B were prepared by blending emulsion (III) with titanium oxide, water and additives in the amount shown in Table 1.

The coating compositions A and B were cast onto fluoroplastic plates and aged for one week in an atmosphere at a temperature of 25° C. and a relative humidity of 60%, obtaining rubbery sheets of 1 mm thick. The rubbery sheets were examined by the following tests.

Strength and Elongation

An elongation test according to JIS A6910.

Coating property

The coatings were visually observed for flatness, orange peel, and irregularity and classified into three ratings of good (◯), fair (Δ), and poor (×).

Workability

The feasibility of spray coating was evaluated in terms of flatness, orange peel, and irregularity and classified into three ratings of good (◯), fair (Δ), and poor (×).

Stain resistance

The sheet sample was tested by spraying pigment powder (carbon black) on the coating surface, allowing the sample to stand for one hour, blowing air to blow off extra pigment powder, and washing with city water to examine how the sample was kept away from staining. The samples were classified into three ratings of good (◯), fair (Δ), and poor (×).

Flame retardance

A surface test according to JIS A1321. The samples were classified into three ratings of good (◯), fair (Δ), and poor (×).

COMPARATIVE EXAMPLE 1

A coating composition was prepared by the same procedure as in Example 1 except that step (2), that is, graft copolymerization with methyl methacrylate was omitted. This composition could not form a coating.

COMPARATIVE EXAMPLE 2

A coating composition was prepared by the same procedure as in Example 1 except that in step (2), the amount of methyl methacrylate used was changed from 9 parts to 2 parts which corresponded to about 6% by weight relative to the polyorganosiloxane in emulsion (I). A test sheet was prepared by coating this composition and tested as in Example 1.

The coating was somewhat tacky and prone to staining.

COMPARATIVE EXAMPLE 3

A coating composition was prepared by the same procedure as in Example 1 except that in step (2), the amount of methyl methacrylate used was changed from 9 parts to 38 parts which corresponded to about 110% by weight relative to the polyorganosiloxane in emulsion (I). A test sheet was prepared by coating this composition and tested as in Example 1.

The results are shown in Table 1.

EXAMPLE 2

Coating compositions F to I were prepared by blending emulsion (III) of Example 1 with the ingredients in the amounts shown in Table 2. Test sheets were prepared by coating these compositions and tested as in Example 1. The results are shown in Table 2.

It is to be noted that strength and elongation were measured at temperatures of −10° C., 20° C., and 60° C. The elongation measurement at 20° C. is the elongation between gages while the elongation measurements at −10° C. and 60° C. are the elongation between chucks.

TABLE 1

|  |  | Example 1 | CE1 | CE2 | CE3 |
|---|---|---|---|---|---|
|  |  | A | B | C | D | E |
| Composition (parts by weight) | | | | | | |
| Emulsion | Graft copolymer | 25% | 25% | 0% | 6% | 110% |
| III | Amount | 44.5 | 31.0 | 31.0 | 31.0 | 31.0 |
| Titanium oxide | | 20.0 | 26.0 | 26.0 | 26.0 | 26.0 |
| Water | | 30.5 | 38.0 | 38.0 | 38.0 | 38.0 |
| Additives | | 5.0 | 5.0 | 5.0 | 5.0 | 5.0 |
| Total | | 100.0 | 100.0 | 100.0 | 100.0 | 100.0 |
| Properties | | | | | | |
| Strength, kg/cm² at 20° C. | | 24.6 | 26.1 | — | 15.0 | 45.6 |
| Elongation, % at 20° C. | | 196 | 58 | — | 350 | 15 |
| Coating | Flatness | ○ | ○ | — | Δ | Δ |
|  | Orange peel | ○ | ○ | — | Δ | Δ |
|  | Irregularity | ○ | ○ | — | Δ | X |
| Workability | | ○ | ○ | — | X | X |
| Stain resistance | | ○ | ○ | — | X | ○ |
| Flame retardancy | | Δ | ○ | — | X | ○ |

TABLE 2

|  |  | Example 2 | | | |
|---|---|---|---|---|---|
|  |  | F | G | H | I |
| Composition (parts by weight) | | | | | |
| Emulsion (III) | | 38.0 | 50.0 | 40.0 | 30.0 |
| Titanium oxide | | 23.0 | 12.0 | 14.0 | 14.0 |
| Extender pigment | | — | 20.0 | 20.0 | 24.0 |
| Water | | 34.5 | 13.5 | 21.5 | 27.0 |
| Additives | | 4.5 | 4.5 | 4.5 | 5.0 |
| Total | | 100.0 | 100.0 | 100.0 | 100.0 |
| Properties | | | | | |
| Strength, kg/cm² at | −10° C. | 39.4 | 34.3 | 14.8 | 18.3 |
|  | 20° C. | 21.5 | 20.6 | 12.0 | 15.1 |
|  | 60° C. | 14.2 | 14.6 | 8.1 | 9.7 |
| Elongation, % at | −10° C. | 18.1 | 18.4 | 99.2 | 62.3 |
|  | 20° C. | 67.7 | 64.0 | 123.5 | 83.2 |
|  | 60° C. | 46.2 | 45.4 | 86.0 | 59.4 |
| Coating | Flatness | ○ | ○ | ○ | ○ |
|  | Orange peel | ○ | ○ | ○ | ○ |
|  | Irregularity | ○ | ○ | ○ | ○ |
| Workability | | ○ | ○ | ○ | ○ |
| Stain resistance | | ○ | ○ | Δ | Δ |
| Flame retardancy | | Δ | ○ | ○ | ○ |

As is evident from the data of Tables 1 and 2, the coating compositions of the invention are excellent in temperature-sensitive performance, coating property, workability, stain resistance, and flame retardance.

Although some preferred embodiments have been described, many modifications and variations may be made thereto in the light of the above teachings. It is therefore to be understood that within the scope of the appended claims, the invention may be practiced otherwise than as specifically described.

We claim:

1. A flame retardant coating composition comprising
(A) 100 parts by weight of a polyorganosiloxane graft copolymer in emulsion form comprised of 10 to 70% by weight of the polyorganosiloxane graft copolymer composed of a polyorganosiloxane of the general formula:

$$R^1_n SiO_{(4-n)/2} \tag{1}$$

wherein $R^1$ is selected from the group consisting of hydrogen, an alkyl group having 1 to 6 carbon atoms, an alkenyl group having 2 to 6 carbon atoms and an aryl group having 6 to 12 carbon atoms, and n is a number equal to 0, 1 or 2 and 10 to 90% by weight of an unsaturated monomer selected from the group consisting of styrene, α-methyl styrene, acrylic acid, methacrylic acid, an acrylate, a methacrylate, butadiene and isoprene graft polymerized therewith,
(B) 0.1 to 10 parts by weight of a reaction product of an amino functional silane and/or a hydrolyzate thereof and an acid anhydride,
(C) 1 to 50 parts by weight of colloidal silica,
(D) 0.01 to 10 parts by weight of a curing catalyst, and
(E) 20 to 100 parts by weight of an inorganic filler.

2. The composition of claim 1, said composition having been prepared by supplying components (B) and (C), as a mixture of components (B) and (C), respectively.

3. The composition of claim 1 said composition having been prepared by first preparing the emulsion of component (A), and mixing the prepared emulsion with a mixture of components (B) and (C), then with component (D), and finally with component (E).

4. An article coated with the coating composition of any one of claims 1, 2, 3.

5. The composition of claim 1 wherein the weight of the unsaturated monomer graft polymerized with the polyorganosiloxane is 20 to 60%.

6. The composition of claim 1 wherein the polyorganosiloxane of component (A) has a molecular weight of at least 10,000 and at least two hydroxy groups attached to silicon atoms in the molecule thereof.

7. The composition of claim 6 wherein the polyorganosiloxane of component (A) has a molecular weight of 10,000 to 1,000,000 and 2 to 10 hydroxy groups attached to silicon atoms in the molecule thereof.

8. The composition of claim 6 wherein the polyorganosiloxane of component (A) has a molecular weight of 100,000 to 1,000,000 and 4 to 6 hydroxy groups attached to silicon atoms in the molecule thereof.

9. The composition of claim 1 wherein the reaction product of components (B) is of the general formula:

$$R^3_m Si(OR^1)_{4-m} \tag{6}$$

wherein $R^3$ is an amino-containing monovalent organic group and $R^1$ is selected from the group consisting of hydrogen, an alkyl group having 1 to 6 carbon atoms, an alkenyl group having 2 to 6 carbon atoms and an aryl group having 6 to 12 carbon atoms, and m is an integer of 1 to 4.

10. The composition of claim 1, wherein the reaction product of component (B) is selected from the group consisting of 3-aminopropyltriethoxysilane, N-(2-aminoethyl)-3-aminopropylmethyldimethoxysilane, 3-aminopropyltrimethoxysilane, N-triethylenediaminepropyltrimethoxysilane, N-triethylenediaminepropylmethyldimetoxysilane and a mixture thereof.

11. The composition of claim 1 wherein the reaction product of component (B) is selected from the group consisting of methyltetrahydrophthalic anhydride, methylhymic anhydride, benzophenonetetracarboxylic anhydride, phthalic anhydride, ethylene glycol bis-trimellitate, maleic anhydride, pyromellitic anhydride, succinic anhydride, polyazelaic polyanhydride, trimellitic anhydride, nadic anhydride, phenylmaleic anhydride, methylhexahydrophthalic anhydride, hexahydrophthalic anhydride, dodecylsuccinic anhydride, dichloromaleic anhydride, chlororendic anhydride and a mixture thereof.

12. The composition of claim 1 wherein the colloidal silica of component (C) has a particle size of 10 to 40 mμ.

13. The composition of claim 1 wherein the curing catalyst of component (D) is a metal salt of an organic acid, an amine compound or a salt of an amine compound.

14. The composition of claim 1 wherein the curing catalyst of component (D) is selected from the group consisting of dibutyltin dilaurate, dioctyltin, dilaurate, dibutyltin diacetate, tin octylate, tin laurate, iron octylate, lead octylate, tetrabutyltitanate and a mixture thereof.

15. The composition of claim 1 wherein the curing catalyst of component (D) is selected from the group consisting of n-hexylamine, guanidine an a salt thereof with hydrochloric acid.

16. The composition of claim 1 wherein the inorganic filler of component (E) is an extender pigment.

17. The composition of claim 1 wherein the inorganic filler of component (E) is selected from the group consisting of calcium carbonate, silica other than colloidal silica, clay, kaoline, talc, titanium dioxide, carbon black, aluminum oxide, quartz, zinc oxide, mica and a mixture thereof.

* * * * *